United States Patent [19]

Kornat

[11] 4,244,544
[45] Jan. 13, 1981

[54] HOLDERS FOR CABLES AND CONDUITS

[75] Inventor: Kazimierz F. Kornat, Chelmsford, England

[73] Assignee: Ford Motor Company, Dearborn, Mich.

[21] Appl. No.: 31,567

[22] Filed: Apr. 19, 1979

[30] Foreign Application Priority Data

May 30, 1978 [GB] United Kingdom ............... 24493/78
Feb. 12, 1979 [GB] United Kingdom ............... 04768/79

[51] Int. Cl.³ .............................................. F16L 3/22
[52] U.S. Cl. ................................. 248/68 R; 248/74 A
[58] Field of Search ............. 174/168, 172; 248/68 R, 248/68 CB, 74 R, 74 B, 74 PB, 74 A; 24/73 SA, 73 PB, 73 AP

[56] References Cited

U.S. PATENT DOCUMENTS

| 3,080,140 | 3/1963 | Gohs et al. ...................... 248/74 R |
| 3,588,011 | 6/1971 | Peres et al. ..................... 248/74 A X |
| 3,916,089 | 10/1975 | Sloan ................................ 24/73 AP |
| 4,148,113 | 4/1979 | Dvorachek ................... 248/74 PB X |

FOREIGN PATENT DOCUMENTS

| 893448 | 4/1962 | United Kingdom ................... 248/74 A |
| 1226569 | 3/1971 | United Kingdom ................... 248/68 R |
| 1379543 | 1/1975 | United Kingdom . |

*Primary Examiner*—J. Franklin Foss
*Attorney, Agent, or Firm*—Peter Abolins; Clifford L. Sadler

[57] ABSTRACT

A holder for cables or conduits comprises a base of resilient plastics material having one or more clips formed integrally on one surface, each clip having two jaws for receiving a cable or conduit, and a supporting bracket to which the carrier is attached by a bolt or other fastener through a central aperture. The carrier is deformed when the fastener is tightened so that the jaws of the clips grasp the cable or conduit more tightly. The carrier is also removably mounted on the bracket by two mounting lugs positioned towards the end of the base. The lugs allow the carrier to be initially loosely mounted on the bracket so that the relative positions of the cables or conduits can be adjusted prior to final tightening of the connector.

5 Claims, 5 Drawing Figures

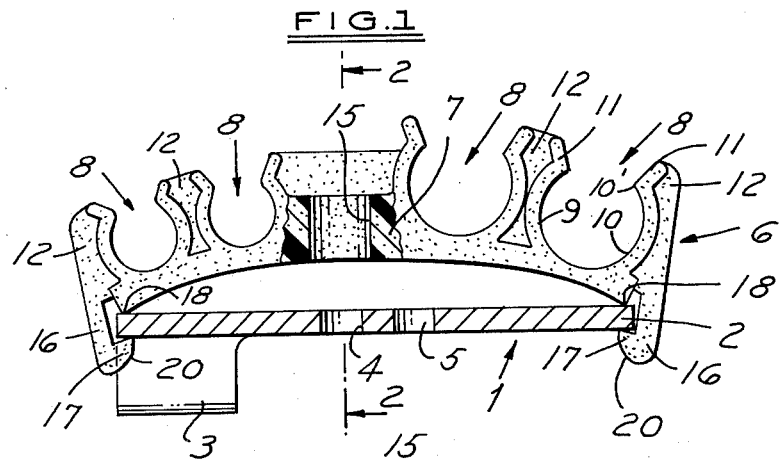
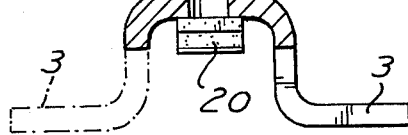
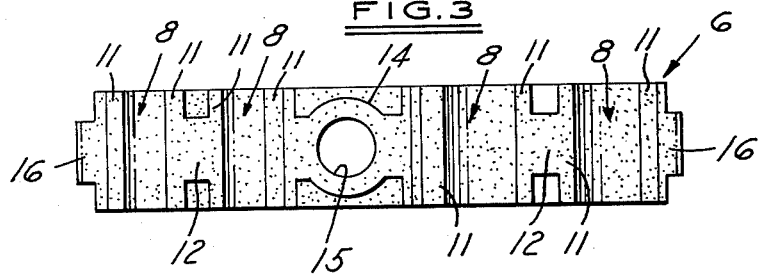
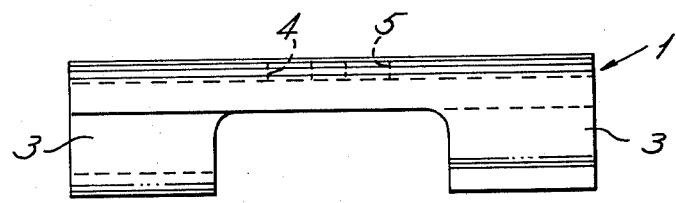

HOLDERS FOR CABLES AND CONDUITS

BACKGROUND OF THE INVENTION (1) Field of the Invention

This invention relates to holders for cables and conduits.

(2) Prior Art

British Pat. Specification No. 1,379,543 discloses a holder for cables and conduits which comprises a carrier, having a base of plastics material and a series of open-ended clips formed integrally on one surface of the base. The carrier is secured directly to a wall or panel by means of a threaded connector which passes through an aperture in the central region of the carrier. As the connector is tightened, the base deforms to increase the grip exerted by the clips on the cables or conduits. In use it frequently occurs that the cables or conduits require adjustment before they are finally secured to the wall or panel; and this can only be achieved by a relatively cumbersome operation, in which the carrier is first loosely secured to the wall or panel, the connector being finally tightened after adjustment of the cables or conduits. Such a time-consuming operation is impracticable in line assembly production processes.

SUMMARY OF THE INVENTION

According to the present invention there is provided a holder for cables or conduits comprising a base of resilient plastics material having one or more open ended clips formed integrally therewith on one surface thereof, each clip having a pair of jaws for receiving a cable or conduit and an aperture in the central region of the base for receiving a connector, the base or carrier being resiliently deformable by movement of the central region relative to the ends to close the jaws of the clip or clips, characterized in that the carrier is removably mounted on a supporting bracket by means of mounting lugs provided towards each end of the base, the supporting bracket being adapted to be mounted on a wall or panel and to engage with a connector in the aperture of the carrier, whereby the central region of the carrier may be drawn towards the bracket.

The mounting lugs allow the carrier to be initially mounted relatively loosely on the bracket by a simple application of pressure. The conduits or cables can then be inserted into the carrier and adjusted into a desired configuration. During this adjustment, the carrier is held steady on the bracket by the lugs, leaving both the operator's hands free. When the cables or conduits have been positioned satisfactorily, the connector is tightened, thus drawing the central region of the carrier towards the bracket, and this secures the carrier to the bracket firmly and also increases the grip of the clip on the cable or conduit, thus reducing the risk of dislocation of the cable or conduit after assembly.

In the preferred embodiment of the invention, the base is an arcuate strip and each clip is mounted on the convex side of the base and is arranged to carry a cable or conduit parallel to the axis of curvature of the strip.

BRIEF DESCRIPTION OF THE DRAWINGS

FIG. 1 is a transverse vertical cross section view through a holder in accordance with the invention;

FIG. 2 is a cross section view on line 2—2 of FIG. 1;

FIG. 3 is a plan view of one part of the holder of FIG. 1;

FIG. 4 is a side view of another part of the holder of FIG. 1; and

DETAILED DESCRIPTION OF THE INVENTION

Figure 5:
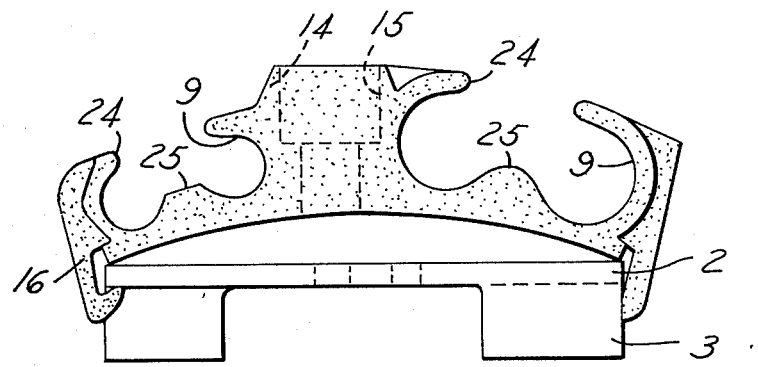
FIG. 5 is a side view of an alternative holder in accordance with the invention.

Referring to the drawings, the holder comprises a bracket 1 which consists of a mounting plate 2 and two feet 3. The mounting plate 2 defines two internally threaded apertures 4, 5, which are equally offset from the center of the plate. In use, the bracket is secured to a supporting wall by welding.

A carrier 6 mounted on the bracket comprises an integral moulding of resilient plastics material, for example high density polyethylene. The carrier 6 is composed of a curved rectangular base 7 on the convex surface of which are integrally moulded four open ended clips 8 for cables or conduits. The clips 8 are aligned parallel to each other and parallel to the axis of curvature of the base 7. Each clip 8 comprises two jaws 9, each adapted to engage opposite side of a cylindrical cable or conduit. Each jaw includes an arcuate wall portion 10, extending through about 120°, a tangentially extending wall portion 10′, and an outwardly flared lip 11. The two lips of each clip form a flared entrance to the clip 8 to facilitate insertion of the cable or conduit into the clip. The walls 10′, 10 are reinforced by upstanding external walls 12.

The central region of carrier 6 defines a boss 14 through which an aperture 15 passes. The aperture 15 is offset from the center of carrier 6 by an amount equal to the amount by which the apertures 4, 5 are offset from the center of the plate 3. The aperture 15 is shaped to receive a threaded coupling element, e.g., a bolt, and is aligned with one or another of the threaded bores 4, 5 in the bracket 1.

Mounting lugs 16 project from the ends of carrier 6 towards bracket 1. Each lug 16 includes an inwardly projecting lip 17, which engages the under surface of bracket 1 to retain carrier 6 on bracket 1. The parts of the base 7 immediately inwards of the lugs 16, are cut back to form noses 18. The carrier 6 is mounted on bracket 1 by pressing carrier 6 onto bracket 1 to cause the lugs 16 to deflect outwardly. This deflection is assisted by bevelled surfaces 20 on the lips 17. When the carrier is mounted on bracket 1, the noses 18 engage bracket 1, but the central region of carrier 6 is spaced therefrom. The carrier 6 can be removed from bracket 1 by flexing carrier 6 sufficiently to disengage the lugs from bracket 1.

In use, the bracket 1 is mounted on a supporting surface by welding the feet 3 to the surface. The carrier 6 is then mounted on the bracket 1 by application of manual pressure. The pipes or conduits are then pressed into the clips 8. In this condition, the pipes or conduits can be moved axially in the clips, thus allowing the positions of pipes or conduits to be adjusted relative to adjacent equipment. When the pipes or conduits have been positioned, the threaded bolt is then passed through the aperture 15 in the central boss of the carrier 6 and is threaded into one or other of the threaded bores 4, 5 depending upon the orientation of the carrier to the bracket. As the bolt is tightened the central region of the carrier 6 moves towards the bracket 1. The ends of the carrier 6 undergo a small sliding movement during this process, and this movement is assisted by the noses 17. As the bolt is tightened, the base 7 adopts a less arcuate configuration, the jaws of each clip move towards each other and the jaws 9 close around the cable or conduit so that the tangential wall portions 10' conform more closely to the surface of the cable or conduit. As a result, the clips 8 grip the cables or conduits more firmly, and resist any tendency of the cables or conduits to slip from the carrier 6.

FIG. 5 illustrates an alternative embodiment of the invention. Parts of this holder similar to those of the holder of FIGS. 1 to 4 have been identified by like reference numerals. The main difference between this holder and the holder of FIGS. 1 to 4 lies in the configuration of the clips 8. The clips 8 are arranged in pairs on opposite sides of the boss 14. For each pair of clips 8, opposite or outer jaws 9 of adjacent clips define an aperture 24 which is positioned above the adjacent jaws which are formed as a common ridge 25 between the outer jaws 9. The width a of the aperture 24 is less than the combined widths c, and b, of the jaws of the two clips in each pair. As a result, the cables or conduits must be inserted into each pair of clips individually, and the possibility of both cables or conduits becoming detached from the pair of clips simultaneously is reduced.

Various modifications and variations will no doubt occur to those skilled in the various arts to which this invention pertains. For example, the particular configuration of the support feet and the relative sizes of the various components may vary from those described herein. These and all other variations which basically rely on the teachings through which this disclosure has advanced the art are properly considered within the scope of this invention.

I claim:

1. A holder for cables or conduits comprising a base or carrier of resilient plastics material having at least one clip formed integrally therewith on one surface thereof, said at least one clip having two jaws for receiving a cable or conduit, and an aperture in the central region of said base for receiving a connector, said carrier being resiliently deformable by movement of said central region relative to the ends to close the jaws of said at least one clip, characterized in that:

said carrier is removably mounted on a supporting bracket by means of mounting lugs provided towards each end of said base, said mounting lugs engaging the ends of said supporting bracket when said carrier is in an arcuate substantially undeformed position, with the jaws of said at least one clip open thus holding said carrier steady to facilitate insertion of the cable or conduit into said at least one clip, and in that:

said supporting bracket is adapted to be mounted on a supporting wall or panel and to engage with a connector in said aperture in said carrier, whereby the central region of said carrier may be drawn towards said bracket, thereby providing a coupling between said carrier and said supporting bracket when said carrier is in a deformed position with the jaws of said at least one clip closed and securing the cable or conduit in said at least one clip.

2. A holder according to claim 1 wherein said base is an arcuate strip and said at least one clip is mounted on the convex surface of said base and is arranged to carry a cable or conduit parallel to the axis of curvature of said strip.

3. A holder according to claim 2 wherein said at least one clip includes at least one jaw having a first wall portion which is arcuate, and a second wall portion extending tangentially therefrom, said second wall portion being movable into conformity with a cable or conduit upon deformation of the carrier.

4. A holder according to claim 3 wherein the opposite and facing jaws of two adjacent clips on said carrier define an aperture which overlies the adjacent jaws of the clips and is of a width less than the combined widths of the jaws of the two clips so that the possibility of conduits in each of said adjacent clips becoming detached from said adjacent clips simultaneously is reduced.

5. A holder for cables and conduits according to claim 3 wherein said carrier includes a curved rectangular portion on the convex surface of which are integrally molded, open ended clips for receiving cables or conduits; said clips being aligned parallel to each other and parallel to the axis of curvature of said rectangular portion; each of said clips comprising two jaws each adapted to engage opposite sides of a cylindrical cable or conduit; each of said jaws including an arcuate wall portion extending through about 120°, a tangentially extending wall portion, and an outwardly flared lip; two lips of each of said clips forming a flared entrance to said clip to facilitate insertion of the cable or conduit into said clip; said carrier further including mounting lugs projecting from the ends of said carrier toward said supporting bracket, each lug including an inwardly projecting carrier lip; said supporting bracket including an under surface for receiving said carrier lip to retain said carrier on said bracket; said carrier lips further including bevelled surfaces so that pressing said carrier onto said bracket causes said lugs to deflect outwardly.

* * * * *